(12) United States Patent
Brockmann et al.

(10) Patent No.: US 11,292,290 B2
(45) Date of Patent: Apr. 5, 2022

(54) METALLIZED PLASTIC COMPONENT HAVING A TRANSILLUMINABLE STRUCTURE IN DAY AND NIGHT DESIGN; METHOD FOR PRODUCING THE PLASTIC COMPONENT

(71) Applicant: KUNSTSTOFFTECHNIK BERNT GMBH, Kaufbeuren (DE)

(72) Inventors: Carsten Brockmann, Landsberg am Lech (DE); Marco Laeufle, Kempten (DE); Franz Huber, Stoettwang (DE)

(73) Assignee: KUNSTSTOFFTECHNIK BERNT GMBH, Kaufbeuren (DE)

( * ) Notice: Subject to any disclaimer, the term of this patent is extended or adjusted under 35 U.S.C. 154(b) by 486 days.

(21) Appl. No.: 15/768,760

(22) PCT Filed: Jul. 4, 2016

(86) PCT No.: PCT/EP2016/065716
§ 371 (c)(1),
(2) Date: Apr. 16, 2018

(87) PCT Pub. No.: WO2017/063768
PCT Pub. Date: Apr. 20, 2017

(65) Prior Publication Data
US 2018/0305834 A1    Oct. 25, 2018

(30) Foreign Application Priority Data

Oct. 16, 2015   (DE) .................... 10 2015 117 652.1

(51) Int. Cl.
*B44C 1/22*   (2006.01)
*C25D 5/14*   (2006.01)
(Continued)

(52) U.S. Cl.
CPC .......... *B44C 1/228* (2013.01); *C23C 18/1653* (2013.01); *C23C 18/1689* (2013.01);
(Continued)

(58) Field of Classification Search
CPC . B44C 1/228; B44C 3/005; B44F 1/06; C23C 18/1641; C23C 18/1653;
(Continued)

(56) References Cited

U.S. PATENT DOCUMENTS

2008/0277157 A1   11/2008  Naito et al.
2010/0003474 A1*   1/2010  Kotsubo ............... H05K 9/0096
                                              428/201

(Continued)

FOREIGN PATENT DOCUMENTS

DE         10208674 B4    7/2011
DE       102010053165 A1  6/2012
(Continued)

OTHER PUBLICATIONS

International Search Report dated Nov. 3, 2016 re: Application No. PCT/EP2016/065716; pp. 1-3; citing: DE 10 2010 053165 A1, EP 1 249 354 A1, US 2008/277157 A1 and EP 2 048 930 A1.

*Primary Examiner* — Sathavaram I Reddy
(74) *Attorney, Agent, or Firm* — Cantor Colburn LLP

(57) ABSTRACT

A metallized plastic component includes a base body of at least one light-permeable plastic to which a metal layer is applied into which at least one illuminatable structure is introduced. The at least one illuminatable structure is formed by an area in the metal layer in which a plurality of light-permeable openings is arranged in a dot matrix.

9 Claims, 4 Drawing Sheets

(51) Int. Cl.
 *C25D 7/00* (2006.01)
 *C23C 18/16* (2006.01)
 *C25D 5/02* (2006.01)
 *C25D 5/00* (2006.01)
 *C25D 5/56* (2006.01)

(52) U.S. Cl.
 CPC ............... *C25D 5/02* (2013.01); *C25D 5/024* (2013.01); *C25D 5/14* (2013.01); *C25D 5/56* (2013.01); *C25D 5/623* (2020.08); *C25D 5/627* (2020.08); *C25D 7/00* (2013.01)

(58) Field of Classification Search
 CPC . C23C 18/1689; C23C 18/2086; C23C 18/24; C23C 18/285; C23C 18/30; C25D 5/02; C25D 5/024; C25D 5/14; C25D 5/48; C25D 5/56; C25D 7/00; H01G 9/20; H01G 9/2027; Y02E 10/542
 See application file for complete search history.

(56) References Cited

U.S. PATENT DOCUMENTS

2012/0045658 A1\* 2/2012 Gong .................... C23C 18/40
 428/626
2014/0119038 A1 5/2014 Mulder et al.

FOREIGN PATENT DOCUMENTS

| DE | 102013202113 A1 | 8/2013 |
|---|---|---|
| EP | 1249354 A1 | 10/2002 |
| EP | 2048930 A1 | 4/2009 |
| EP | 2060443 A2 | 5/2009 |

\* cited by examiner

METALLIZED PLASTIC COMPONENT HAVING A TRANSILLUMINABLE STRUCTURE IN DAY AND NIGHT DESIGN; METHOD FOR PRODUCING THE PLASTIC COMPONENT

TECHNICAL FIELD

The disclosure relates to a metallized plastic component, comprising a base body of at least one light-permeable plastic to which a metal layer is applied which incorporates at least one translucent structure.

The disclosure also relates to a method for manufacturing such a plastic component.

BACKGROUND

It is known that the surface of plastic components can be metallized to impart an attractive exterior appearance to them for decorative reasons in particular. This is already down for operating elements in motor vehicles, for example, such as handles, knobs, buttons and switch bars but also for decorative strips, loudspeakers, etc. Such plastic components are also frequently used in the area of household appliances.

Essentially two conventional methods are used to produce metallized elements of plastic. These methods are based either on metallization of a component made of plastic by means of PVD methods (PVD=physical vapor deposition) or on galvanization of an element made of plastic by means of electrochemical methods. Basically, both methods make it possible to apply stable metal coatings to components made of plastic, and these methods have different advantages and disadvantages. For example, it is problematical to metallize operating elements by means of PVD methods, so that the metal layer deposited on the plastic component also has a sufficient abrasion resistance and corrosion resistance without an additional protective layer of a transparent protective coating, for example. Plastic components metallized by means of PVD methods also do not have the "cold touch" which is often desired, i.e., the haptics of the metallized plastic component do not conform to those of a metal part // because of the low layer thicknesses of the applied metal layers. Galvanization of plastic components therefore has proven to be more advantageous in particular in the field of operating elements in motor vehicles.

It is often desirable to be able to x-ray // to illuminate such a plastic component in some areas, so that a translucent symbol is formed in the metal layer so that it remains readily visible even in the dark. This symbol may be formed in the metal layer in the various ways. For example, the patent specification DE 102 08 674 B4 describes a method for manufacturing operating elements, decorative or display elements with translucent symbols, with which an area of a plastic component is first covered on the rear side to prevent the plastic from being galvanized // metal-plated in this area. The cover may be formed by a stick-on label for a so-called solder resist // stop coating. Next a thin metal layer is applied first but then can be removed again easily in the area of the symbol. Next the metallic surface coating can be completed in the remaining area of the metal layer by galvanization in such a way that the symbol is retained.

Thus plastic components that can be backlighted by luminous means such as LEDs and/or optical fibers and form a component with an attractive visual appearance in the so-called night design have already become available. The form // shape of the backlightable structure is approximately freely selectable. Depending on the structure created and the requirements made of the component however it may be a disadvantage if the structure is also visible in daylight and without a backlighting. Under some circumstances the structure is so clearly visible under these conditions and/or is so remarkable that it has a negative effect on the desired daytime design of the component.

SUMMARY

The present disclosure provides a metallized plastic component having a backlightable structure which can have the appearance of a metal layer without backlighting in the so-called daytime design.

According to the disclosure, these advantages are achieved by providing a plastic component comprising a base body made of at least one light-permeable plastic to which a metal layer is applied and into which at least one illuminatable structure is introduced, wherein the at least one illuminatable structure is formed by an area of the metal layer in which a plurality of light-permeable openings are arranged in a dot matrix. Advantageous refinements of the plastic component are derived from dependent claims 2 through 9. Furthermore the advantages are achieved by providing a method for manufacturing a metallized plastic component with at least one illuminatable structure in a metal layer in which a metal layer formed by one or more layers is created on a base body, wherein to create the at least one illuminatable structure the metal layer is structured in an area of the metal layer where a plurality of openings in the form of a dot matrix is created in the metal layer. Advantageous refinements of this method are derived from the claims.

The metallized plastic component according to the disclosure comprises a base body made of at least one light-permeable plastic, to which a metal with at least one translucent structure incorporated into it is applied. According to the disclosure, the at least one translucent structure is formed by an area in the metal layer, which has a plurality of light-permeable openings arranged in a dot matrix. In an area of the metal layer, where a translucent structure is to be formed, this area is therefore not completely free of material of the metal layer but instead this area is formed by a translucent grid structure having a plurality of suitable openings.

This has the advantage that the number and dimensions of the openings in the dot matrix within a structure can be selected so that the optical task that has been set can be carried out. The parameters can then be selected so that the surface of the structure in the nighttime design is translucent, which makes the structure readily recognizable. The parameters can be selected at the same time, so that the structure is hardly perceptible at all without backlighting in the so-called daytime design, i.e., it has the appearance of an approximately continuous metal layer.

However, a partial visibility of the structure in the daytime design may also be desired. With a corresponding choice of parameters of the dot matrix, the structure can then be illuminated easily in the nighttime design but is still recognizable in the daytime design. However, the parameters are selected to yield a visually attractive daytime design.

The translucent structure may be provided only in a subarea of the metal layer of the component in order to form symbols there or a decorative element. However, the metal layer may also be structured completely with a dot matrix comprised of a plurality of openings to thereby provide a plastic component, which can be illuminated completely in the nighttime design. Without backlighting, the component acts as a completely metallized component with a corresponding decorative metal effect in the daytime design.

Furthermore, structures such as symbols, lettering, graphic elements, etc. may also be formed inside a metal surface, so that the respective structure can be illuminated. However, it is also possible to form a structure by means of a metal area, which is located inside a translucent area. In this case, it would not be the structure itself that can be illuminated but rather the area surrounding the structure. In this way, the structure would also be recognizable in the nighttime design, whereas it would be approximately invisible in the daytime design or would at least have corresponding optics.

The openings may be arranged in various patterns inside the dot matrix used and/or the grid structure. For example, these may be ordered or disordered patterns. However, regular patterns are preferably used, wherein the openings may be arranged in several rows in particular. This has the advantages that the openings fill up an area as uniformly as possible, such that the distance between neighboring openings of a row may be selected to be approximately the same. This contributes toward a homogenous appearance of the grid structure formed by the openings.

The shape of the respective openings may also be different. For example, round or rectangular and/or square openings may be considered. For example, openings with a polygonal shape and rounded corners have also proven to be advantageous, but good results can also be achieved with shapes having rectangular openings with rounded corners.

The dimensions of the openings and their distances from one another are also essential for the desired day and night design. It has proven advantageous for the maximum extent of the openings to be between 0.02 and 0.3 mm. In this range, both approximately invisible as well as partially visible structures can be created. For example, an area between 0.02 and 0.08 mm has proven advantageous for approximately invisible structures, in that a corresponding optical effect can be achieved. Good results can be achieved in particular with a diameter between 0.04 and 0.06 mm with round openings. In doing so, the illumination // x-ray capability of the structures was worse at diameters of less than 0.04 mm whereas when the diameters of the openings were greater than 0.06 mm // the openings were so large that the structure was relatively noticeable even without backlighting.

However the best choice for the extent of the openings also depends on the requirements made of the respective component. To create partially visible structures, for example, extents between 0.09 and 0.3 mm have proven advantageous. In particular, good results have been achieved between 0.07 and 0.15 mm.

For the distance between the openings, a distance between the midpoints of neighboring openings between 0.1 and 0.2 mm has proven advantageous. In particular good results have been achieved with a distance of 0.12 mm. These are neighboring openings in the case of openings in a row directly side-by-side.

The metallization of the base body made of plastic may be accomplished in various ways. For example, PVD methods or galvanization of a galvanizable plastic may be used. Galvanizable plastics including, for example, polyamide, ABS or ABS polycarbonate blends may be used in that way. The thickness of the metal layer may be between 10 and 50 μm, for example.

The openings to form the translucent grid structure may be created in the metal layer after the latter has been produced or may be created already at the time of production of the metal layer. This can take place by masking certain regions and/or by means of laser ablation, for example.

A method for producing a metallized plastic component with at least one translucent structure in a metal layer, in which a metal layer formed by one or more layers is created on a base body, is also covered by the disclosure. To create the at least one translucent structure in an area of the metal layer, the metal layer is structured, wherein multiple openings are created in the form of a dot matrix in the metal layer.

This can be achieved by providing a galvanization method, which includes the following method steps in a particularly advantageous manner:
  a) Creating a plastic blank,
  b) Chemical or physical deposition of a first metal layer that is electrically conductive on the plastic blank,
  c) Structuring the first metal layer by partial removal to form a structure, and
  d) Electrochemical deposition of at least one second metal layer on the structured first metal layer,
wherein the structuring of the first metal layer takes place by means of laser ablation by lasering multiple openings in the form of a dot matrix into the first metal layer to form a structure.

In this embodiment of the method according to the disclosure, the structure is therefore not lasered into a finished metal layer but instead into a first metal layer which is created on a plastic blank initially for galvanization thereof. In the subsequent electrochemical deposition of a second metal layer, the lasered openings are not coated with this second metal layer so that corresponding openings are also formed in the resulting metal layer.

The contours of the lasered openings through the subsequent galvanization are typically softer, which can reduce the requirements of the laser ablation. Rectangular or polygonal openings would have rounded corners after galvanization. For example, it is not necessary to laser circular openings into a first metal layer in order to obtain approximately round openings in the resulting decorative layer. Instead the openings may also be created by a plurality of lasered lines that are close together. For example, one embodiment of the disclosure provides that each opening is formed by at least two lines which are lasered side-by-side in the same orientation // lasered into the first metal layer. Three such lines are preferably lasered into the first metal layer in the same orientation.

If these lines are the same length, they form a rectangle with slightly rounded corners. Then metal is deposited at the edges of the openings in the subsequent galvanization so that the corners become softer and therefore the shape of an opening formed in this way approaches that of a circle. If a central line with a greater length than the two others is selected, the result is also a rectangle whose corners become softer in galvanization. The maximum extent of the openings lasered into the first metal layer is thus selected to be somewhat larger than the maximum extent of the desired openings in the resulting metal layer.

It is thus possible to create a plastic component according to one of the embodiments already discussed in an advantageous manner, such that the translucent structure can easily be produced by means of lasering of an intermediate layer on a galvanizable plastic blank. In doing so the contours of the openings become softer due to the subsequent galvanization, which can improve the visual appearance of the structure in particular in the daytime design.

BRIEF DESCRIPTION OF THE DRAWINGS

Additional advantages of the disclosure are derived from the dependent claims and the following description of preferred exemplary embodiments on the basis of the illustrations.

In the drawings.

DETAILED DESCRIPTION OF THE DRAWINGS

Figure 1:
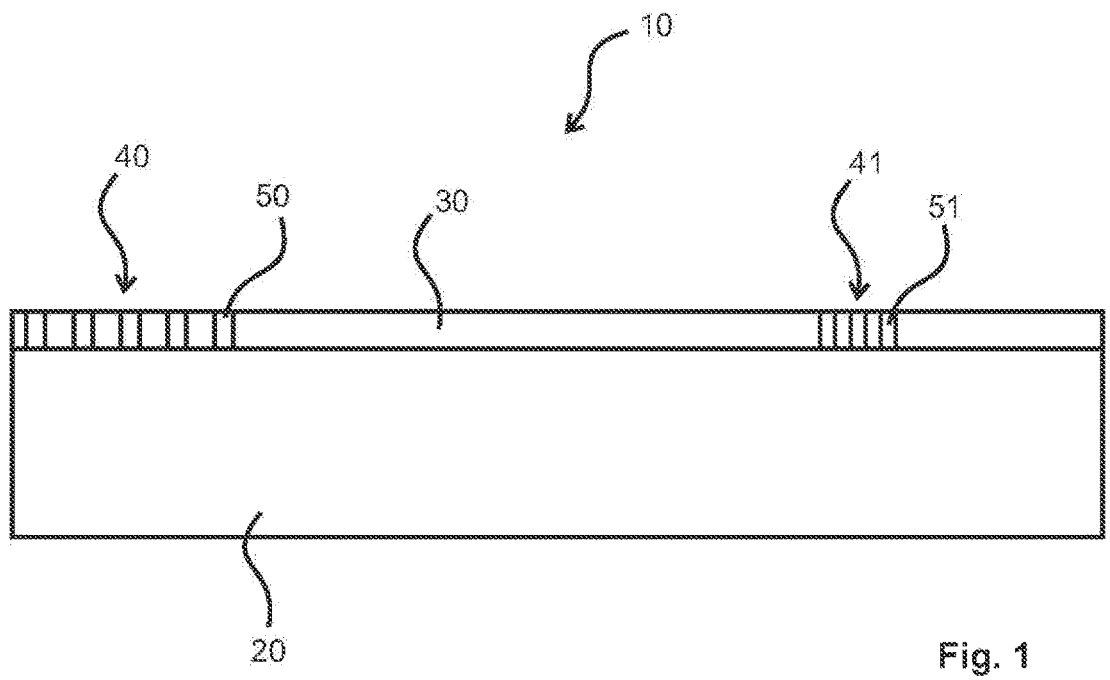
FIG. 1 shows a schematic section through one embodiment of the plastic component according to the disclosure.

The schematic diagram in FIG. 1 shows a section through an exemplary embodiment of the plastic component 10 according to the disclosure. Component 10 includes at least one transparent base body 20 applied to a metal layer 30. To simplify the diagram, the metal layer 30 is shown as relatively thick in comparison with the base body 20, wherein the thickness of the metal layer 30 may be of the order of magnitude of 10-30 μm, for example, while the base body 20 is many times thicker. The base body 20 is so thick, for example, that it forms // shapes a stable component for the respective intended purpose but is x-ray capable // can be illuminated by a light source. Its thickness may be greater than 2 mm, for example, in particular, greater than 4 mm.

The metal layer 30 has a plurality of openings introduced into it, but only two openings of these are labeled with reference numerals 50 and 51 in FIG. 1. These openings pass completely through the metal layer 30 and the base body 20 is transparent so that the component can be backlighted with a light source. Light can thus pass through the base body 20 and the openings 50, 51, so that a luminous structure can be formed on the metal layer 30. In FIG. 1 multiple openings form two structures 40 and 41 as can also be seen in the schematic top view in FIG. 2. FIG. 1 shows a section through a plurality of these openings.

The size of the openings in the figures is not drawn true to scale but instead they are many times smaller so that a structure is formed from far more openings than shown in the figures for the sake of a simpler diagram.

The x-ray capability // illumination of the plastic component and thus a structure may be accomplished in various ways. For example, one or more light sources may be provided behind the base body for this purpose. LEDs in particular may be used as the light sources. A base body in the form of an optical waveguide may also be used for backlighting of structures.

Figure 2:
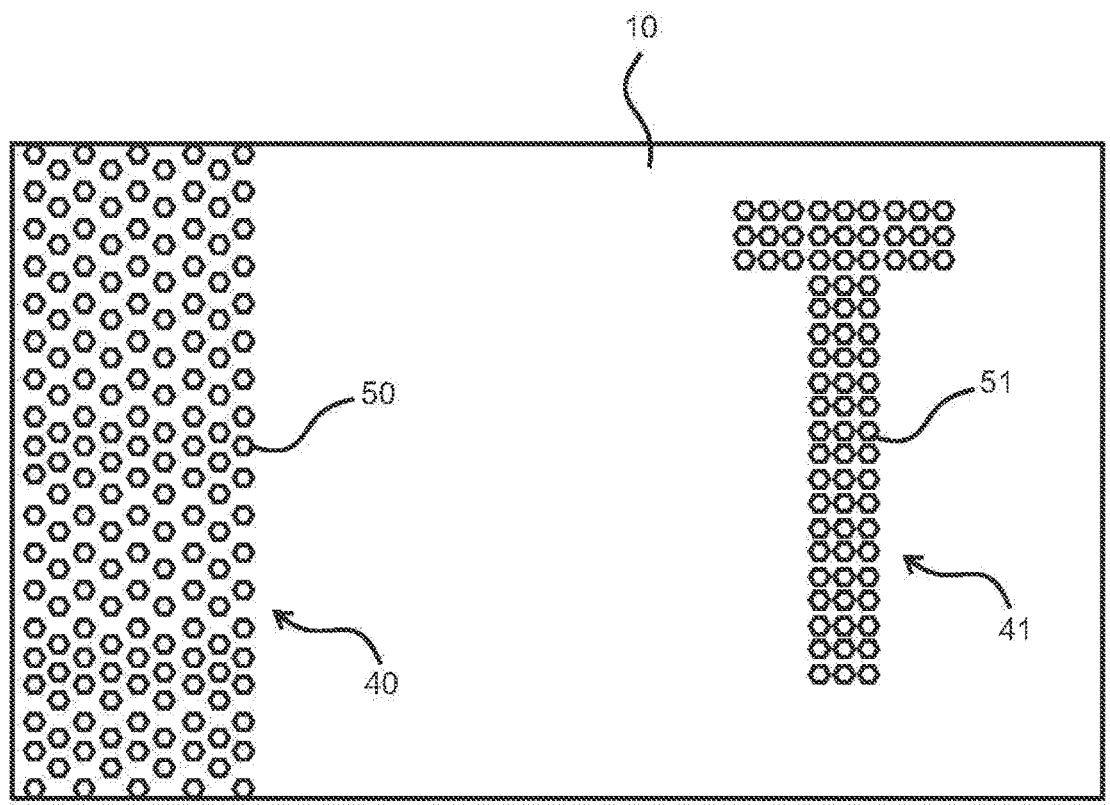
FIG. 2 shows a schematic top view of a plastic component having two backlightable structures.

Structures 40 and 41 in FIG. 2 are simple structures as an example. Structure 40 covers a left region of the component completely which illustrates how a component might be structured to make it appear completely in the illuminated nighttime design and daytime design with metal optics. The remaining area of the metal layer of component 10 could thus be provided with the grid structure of structure 40.

The second structure 41 however forms the letter "T" to show how the component might be structured in part to form symbols. However any other structures such as words, numbers, symbols, patterns, elongated lines, etc. could also be selected. Structures 40, 41 are each formed by a plurality of openings forming a suitably shaped dot matrix. An area to be illuminated inside the metal layer 30 is thus formed by an area in which there is a plurality of openings.

The shape of the openings is approximately circular in the exemplary embodiment in FIG. 2, where a polygon with slightly rounded corners has been selected. The openings are arranged in several rows in the dot matrix. In the case of the structure 41 on the right, the individual rows run at an angle of 90° to the side faces of the component 10. In the structure 40 on the left these rows are arranged so they are offset from one another; for example, the grid structure is rotated by 45°.

The number and/or dimensions of the openings of the respective structures 40, 41 are selected so that the structures can be backlighted, i.e., the openings are large enough and are spaced a sufficient distance apart from one another to yield a visually continuously area in backlighting which is made visible by backlighting on the metal layer 30. Without backlighting however a structure does not appear as an irregular area with a plurality of openings but instead the dimensions of the openings are at the same time selected so that, for example, a structure without backlighting will appear approximately like a continuous metal area appear visually.

Figure 3:
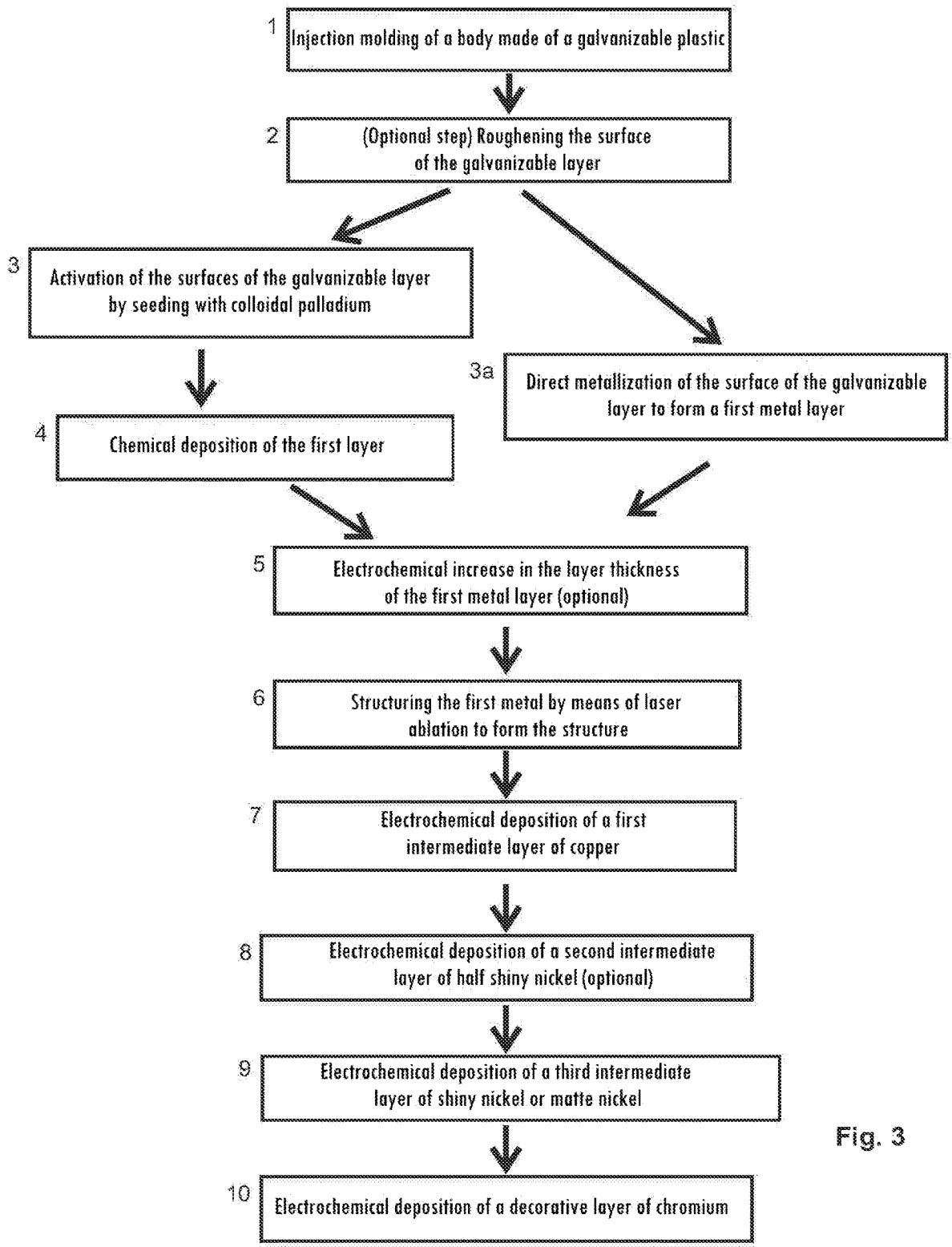
FIG. 3 shows a flow chart of the steps in a possible method for manufacturing a metallized plastic component.

FIG. 3 shows a flow chart of the steps in one possible method for manufacturing such a plastic component.

In method step 1 a body made of a galvanizable plastic (for example, ABS/polycarbonate blend) is produced by injection molding, for example. This may take place in a conventional injection molding process in which the body may also be formed by a two-component plastic component // part in which a subcomponent is made of a galvanizable plastic while another subcomponent is made of a nongalvanizable plastic (for example, polycarbonate).

In the next method step 2 at least the surface of the galvanizable layer of the component is subjected to a pickling process in which the butadiene fractions are dissolved out of the surface of the ABS plastic component. This method step is preferably carried out in a chromium-sulfuric acid bath. In addition to roughening of the galvanizable surface of the plastic part, impurities are removed from the galvanizable surface, in particular any adhering organic compounds.

In method step 3 the galvanizable surface of the base body is activated, i.e., the surface is seeded with palladium seeds // nuclei from a colloidal solution, for example, such that the palladium seeds are preferably covered by a tin protective colloid. The tin protective colloid is removed by washing, forming a surface with active palladium.

In method step 4, an electrically-conductive first metal layer is applied chemically to the activated surface of the base body, i.e., without using a galvanization current. To do so the base body is introduced into a suitable nickel bath from which nickel is deposited on the activated surface of the base body (so-called "chemical nickel"). The resulting thin nickel layer ("first metal layer") has a thickness of 1 μm, for example.

In an alternative process management, the galvanizable surface of the base body is activated in method step 3*a*, i.e., the surface is seeded with palladium seeds from a colloidal solution such that the palladium seeds are preferably covered by a tin protective colloid. This is replaced by copper in an alkaline solution in a method step which is not illustrated. The resulting copper layer here forms a sufficiently great coverage and therefore electrical conductivity to be able to allow electrochemical galvanization without any additional intermediate steps (such as deposition of chemical nickel/chemical copper, for example). This method is also referred to as direct metallization.

In addition it is known that the sequence of method steps not shown in the figure also includes swelling of the plastic (ABS, ABS-PC, PC, PES, PEI, PEEK, etc.), pickling in an oxidizing solution (chromium sulfuric acid, potassium permanganate, etc.), activation in a solution containing a metal complex, crosslinking by forming metal sulfides in an alkaline sulfide solution and finally electrochemical galvanization in a metal bath makes it possible to omit a time-consuming currently deposition of chemical nickel and/or chemical copper.

In the optional method step 5 the layer thickness of the thin nickel layer is increased by a few hundred //100// nanometers by means of electrochemical deposition of nickel or copper at a low amperage in order to increase the conductivity and/or load-bearing capacity of the first metal layer ("preliminary nickel," "preliminary copper").

In the next method step which is not illustrated, the base body which is covered with the first metal layer (i.e., a thin nickel layer and optionally a layer of preliminary nickel or preliminary copper) on the galvanizable surface is removed from the galvanic process, washed and dried.

In the next method step 6, the first metal layer is structured by means of a laser to form at least one structure in the resulting metal layer and/or to structure the metal layer approximately completely. This may take place with an IR labeling // inscription laser, for example. To do so the plastic blank is secured on a receptacle in a suitable manner and an Nd:YAG or $CO_2$ laser may be used for the laser ablation. To form the desired openings in the resulting structure, openings with a similar shape can also be lasered in the first metal layer. These shapes may be circles, ovals, rectangles, polygons, lines, etc.

It has been found that an expedient form shape of an opening can be produced, for example, by lasering multiple lines which are lasered one after the other into the first metal layer. This forms a rectangle or polygon with slightly rounded corners. For example, three lasered lines are used for this purpose. These lines may all be the same length or a center line, for example, may be longer than the upper line or the lower line. In the subsequent galvanization, the corners of these openings are further rounded so that the respective opening approximates a round shape or at least its corners are rounded.

One or more of the plastic blanks produced in this way are subsequently sent to the galvanic process // plastic blanks with the first metal layer now structured. In the next method step 7, a first metallic intermediate layer is deposited galvanically here in a first (or second if preliminary copper or preliminary nickel has been applied) electrochemical galvanic step. This [intermediate layer?] is usually made of copper and has a thickness of typically between 10 and 20 micrometers.

In the subsequent method steps 8 and 9, a second intermediate layer of nickel is deposited on the first intermediate layer of copper // galvanically. This layer may be embodied, for example, as a single layer of matte nickel with a thickness of 5-10 micrometers. Alternatively the second intermediate layer may also be embodied as a sequence of layers of shiny nickel, half shiny nickel, matte nickel, microporous nickel and/or crizzled nickel. In practice a layer structure of approx. 5 micrometers of half shiny nickel to which a layer with a thickness of approx. 5 micrometers of matte nickel or shiny nickel (depending on the desired optics of the completed metallized surface) is subsequently applied. This layer structure has a high corrosion resistance because of the positive properties of half shiny nickel. If the metallized components are provided for use in a highly corrosive environment, it has proven successful to use at least one intermediate layer of crizzled nickel, in particular a layer sequence of half shiny nickel, shiny or matte nickel and crizzled nickel for the second intermediate layer.

Finally in method step 10, a layer of a decorative metal is galvanically deposited on the second intermediate layer of nickel, wherein this layer may be chromium, for example. Typical layer thicknesses of this decorative layer are generally between 100 nanometers and a few micrometers or in the case of chromium preferably at least 300 nanometers.

In conclusion, a lacquer // coating layer may still be applied in a final method step (not shown), wherein this lacquer layer may modify or improve the optics of the metal layer applied to the front side and/or its corrosion resistance.

Components produced in this way can be subjected to examination under transmitted light at the end of the manufacturing process in order to investigate the optical properties of the surfaces structured by laser ablation.

Figure 4:
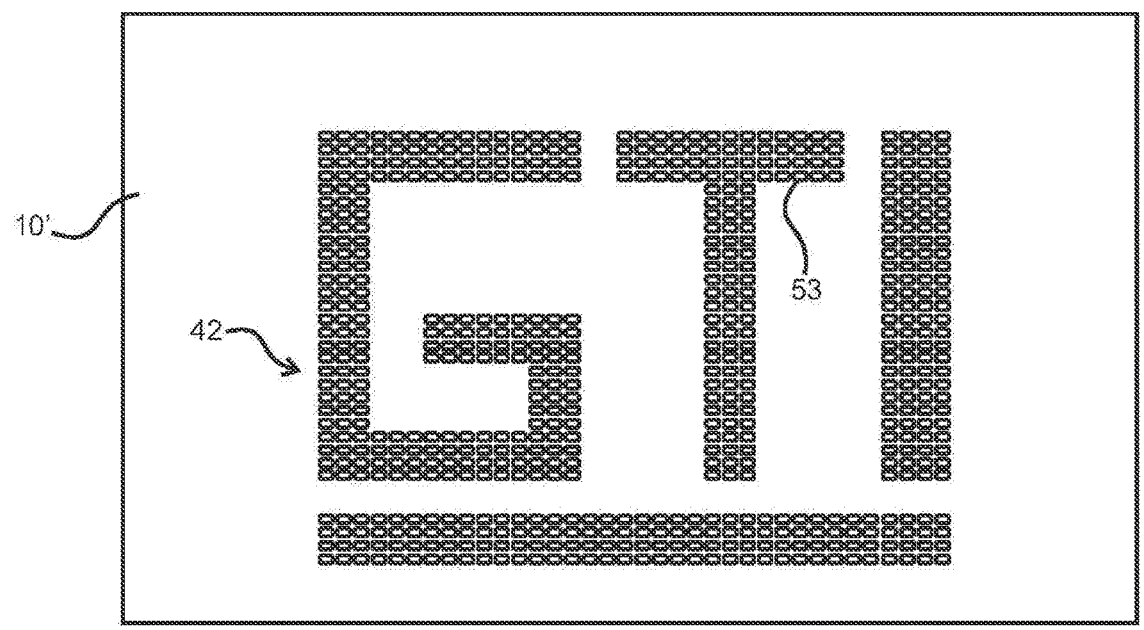
FIG. 4 shows a schematic top view of a plastic component having a backlightable structure within an area // a surface.
Figure 5:
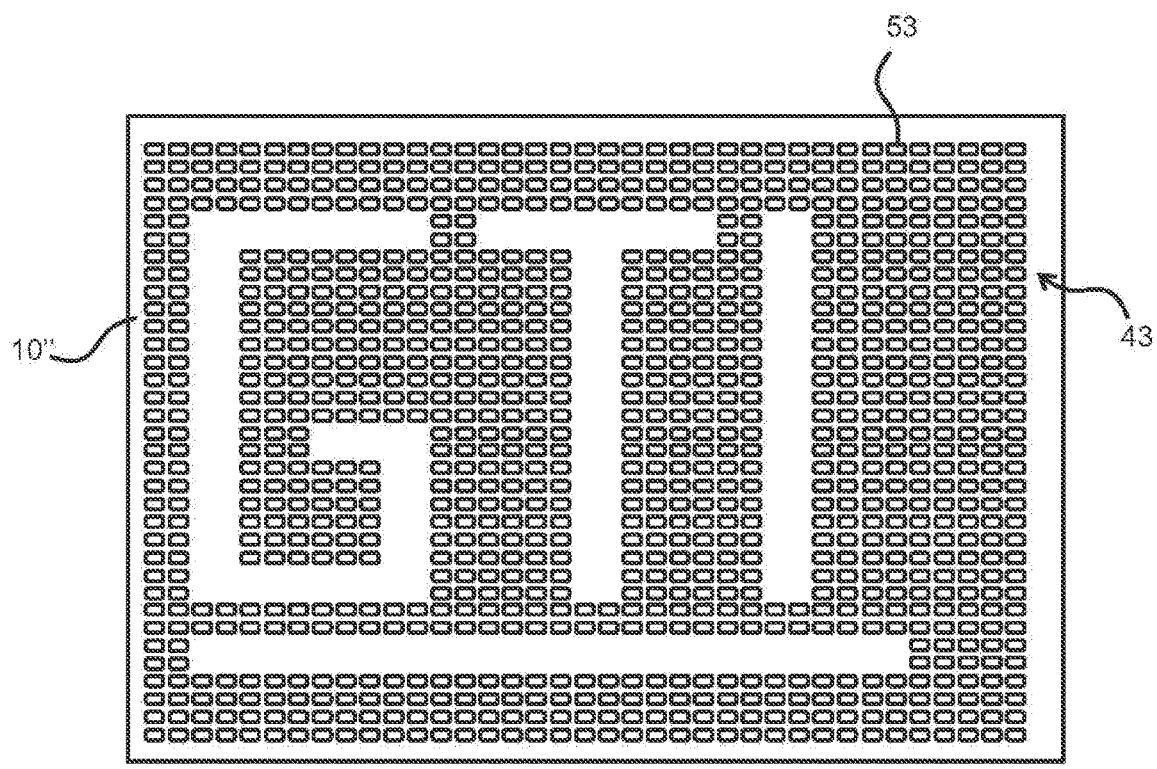
FIG. 5 shows a schematic top view of a plastic component having a structure within a backlightable area.

Whereas polygonal openings with an approximately circular shape were used in the embodiment in FIG. 2, FIGS. 4 and 5 illustrate embodiments with rectangular openings whose corners are slightly rounded. The rectangular openings are preferably longer in one direction of extent than in another direction of extent. The "GTI" structures introduced are characters whose shape is also longer in one direction of extent than in another direction of extent. It has proven advantageous if the rectangular openings extend in the same longitudinal direction as the direction of writing. In this way the structures appear very attractive visually. This means that for characters running horizontally, the rectangular openings are also arranged horizontally. In the case of FIGS. 4 and 5, the openings are arranged in several rows in a dot matrix.

In the embodiment of a plastic component 10' according to FIG. 4 the "GTI" characters can be backlighted as structure while the area surrounding the characters cannot be backlighted but instead includes a continuous metal layer. The rectangular openings 53 lie in the direction of the writing, but here again the dimensions of the openings are not drawn true to scale but instead for the sake of simplifying the diagram, only a limited number of openings 53 are shown.

In the embodiment of a plastic component 10" according to FIG. 5 however, the "GTI" characters cannot be backlighted as structure 43 whereas the areas surrounding the characters can be backlighted. Here again rectangular openings 53 also lie in the direction of the writing.

Figure 6:
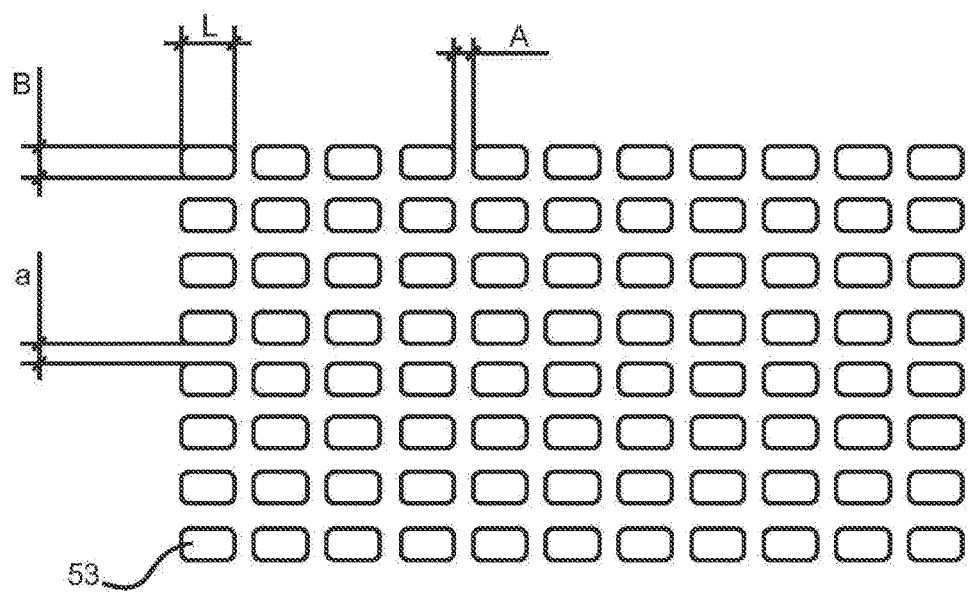
FIG. 6 shows an enlarged view of rectangular openings inside a backlightable structure.

The maximum extent of openings and their distance from one another are selected so that the desired day and night design is obtained as a result. FIG. 6 shows a detail of a backlightable structure formed by a plurality of rectangular openings 53 with rounded corners. If, for example, the partial visibility of a structure in the daytime design is to be achieved with such a dot matrix, then dimensions in certain orders of magnitude have proven advantageous. For example, these may be between 0.09 and 0.3 mm, in particular between 0.07 and 0.15. In the case of rectangular openings, the length L may be between 0.09 mm and 0.15 mm, for example, whereas the width B may be between 0.07 and 0.12 mm. The distance A between the short sides of the rectangular opening [sic/TN] may be between 0.04 mm and 0.05 mm whereas the distance a between two long sides of a rectangular opening may be between 0.05 mm and 0.08 mm. If the visibility of a structure in the daytime design is to be reduced, then smaller openings accordingly are selected. If the visibility is to be further increased, larger openings will be selected accordingly.

Figure 7:
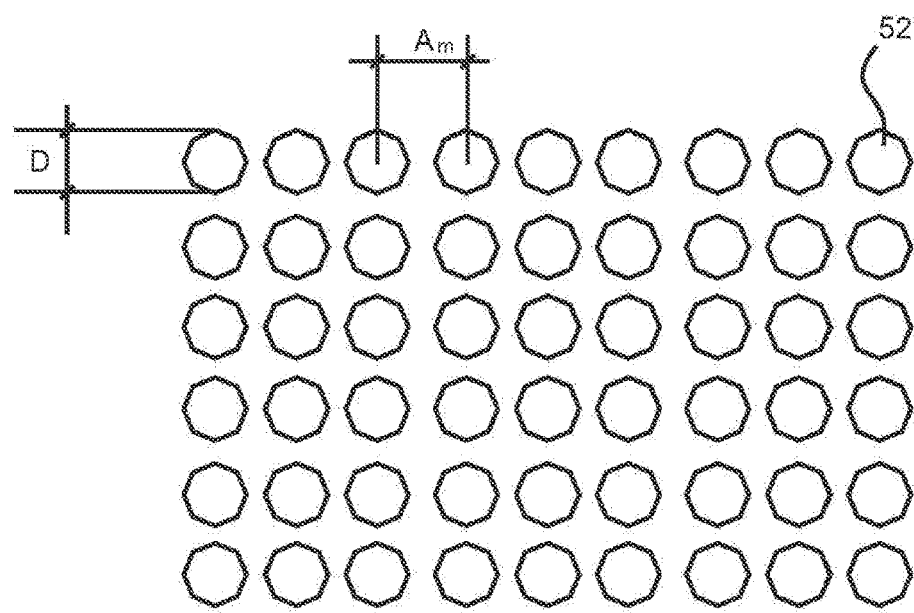
FIG. 7 shows an enlarged of approximately round openings inside a backlightable structure.

FIG. 7 shows a detail of a backlightable structure formed by a plurality of polygonal openings 52 having an approximately round shape. If an almost invisible structure in daytime design is to be achieved with such a dot matrix, then dimensions in certain orders of magnitude have also proven advantageous. The diameter D of an opening 52 is then between 0.02 and 0.08 mm, for example, in particular between 0.04 and 0.06 mm. The distance $A_m$ between the midpoints of two neighboring openings in a row is between 0.1 and 0.2 mm, for example, in particular approx. 0.12 mm. If a partial visibility of the structure in the daytime design is to be achieved, then larger diameters D will then be selected accordingly and the distance $A_m$ between the openings may also be increased if necessary.

The invention claimed is:

1. A metallized plastic component comprising:
    a base body made of at least one light-permeable plastic to which a metal layer is directly applied and into which at least one illuminatable structure is introduced, wherein the at least one illuminatable structure is formed by an area of the metal layer in which a plurality of light-permeable openings are arranged in a dot matrix, wherein the metal layer comprises an electrically conductive first metal layer, which is chemically or physically deposited on the base body and into which the at least one illuminatable structure is introduced to form a structured first metal layer, and
    further comprising at least one second metal layer, which is electrochemically deposited on the structured first metal layer,
    wherein the light-permeable openings are selected in their number and/or dimensions so that the at least one illuminatable structure can be backlighted,
    wherein the light-permeable openings are large enough and are spaced a sufficient distance apart from another to yield a visually continuously area in backlighting which is made visible by backlighting on the metal layer, and
    wherein the light-permeable openings are at the same time selected so that the at least one illuminatable structure approximately visually appears like a continuous metal area.

2. The metallized plastic component according to claim 1, wherein the plurality of light-permeable openings in the dot matrix form a plurality of straight rows.

3. The metallized plastic component according to claim 1, wherein each of the plurality of light-permeable openings have a round shape, a rectangular shape, or a polygonal shape with rounded corners.

4. The metallized plastic component according to claim 1, wherein the maximum extent of each of the plurality of light-permeable openings is between 0.02 mm and 0.3 mm.

5. The metallized plastic component according to claim 4, wherein the maximum extent of each of the plurality of light-permeable openings is between 0.02 mm and 0.08 mm.

6. The metallized plastic component according to claim 4, wherein the maximum extent of each of the plurality of light-permeable openings is between 0.09 mm and 0.3 mm.

7. The metallized plastic component according to claim 1, wherein the distance between the midpoints of neighboring openings is between 0.1 mm and 0.2 mm.

8. The metallized plastic component according to claim 1, wherein the base body is made of a galvanizable plastic.

9. The metallized plastic component according to claim 1, wherein the thickness of the metal layer is between 10 μm and 50 μm.

* * * * *